Patented May 25, 1954

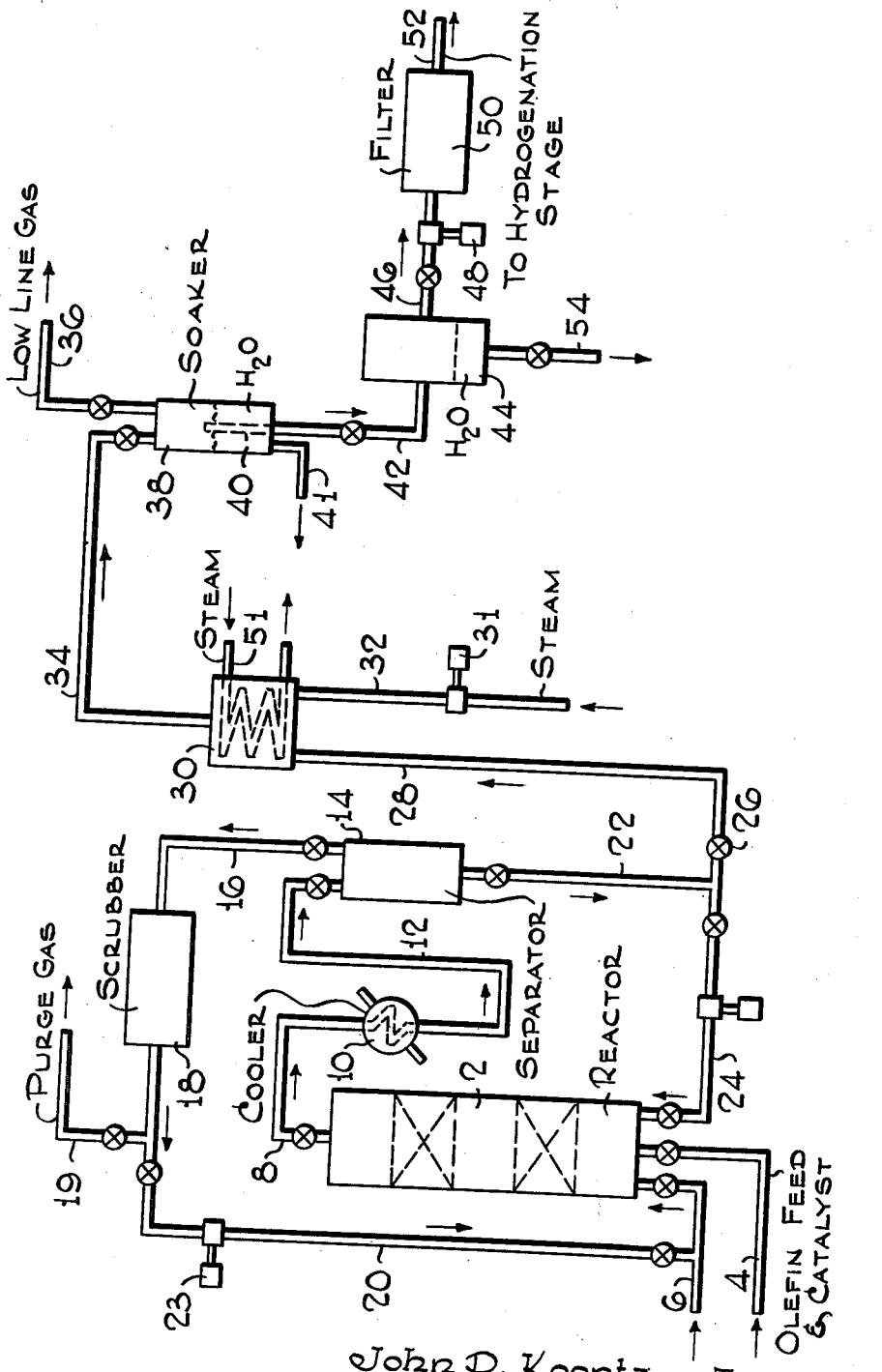

2,679,534

UNITED STATES PATENT OFFICE 2,679,534

DECOBALTING OXO ALDEHYDE PRODUCT IN THE PRESENCE OF LIQUID WATER

John D. Koontz, Baton Rouge, La., assignor to Standard Oil Development Company, a corporation of Delaware Application November 20, 1950, Serial No. 196,634

15 Claims. (Cl. 260—604)

This application is a continuation-in-part of application Serial Number 53,161, entitled "Catalyst Removal in the Carbonylation Reaction," filed October 7, 1948, now abandoned.

The present invention relates to the preparation of organic compounds by the reaction of carbon monoxide and hydrogen with carbon compounds containing olefinic linkages in the presence of a carbonylation catalyst. More specifically, the present invention relates to the recovery of the cobalt catalyst utilized in the foregoing reaction from the product of the first stage of the cobalt carbonylation reaction for further use in the process.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in its salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalysts in the first stage of the prior art processes are usually added in the form of salts of the catalytically active metal with higher molecular fatty acids, such as stearic, oleic, palmitic, naphthenic, etc., acids. Thus, suitable catalysts are, for example, cobalt oleate or naphthenate, or iron linoleate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions of reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general, about 2500 to 15000 cubic feet of $H_2+CO$ per barrel of olefin feed are employed.

It will be understood that the "synthesis gas," previously referred to, i. e., a gaseous mixture containing primarily $H_2$ and CO may be made by a plurality of conventional methods. For instance, it may be made by the "water gas" reaction, in other words, by reacting say coke with steam. Or, it may be made by "reforming" methane or natural gas with steam, or a mixture of steam and carbon dioxide.

At the end of the first stage, when the desired conversion of olefins to oxygenated compounds has been effected, the product and the unreacted material are generally withdrawn to a catalyst removal zone, where dissolved catalyst is removed from the mixture and it is to this stage that the present principal invention applies.

From the catalyst removal zone the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl, or hydro carbonyl. There is basis for the belief that the metal carbonyl itself is the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is, therefore, removed in the catalyst removal, or decobalting zone. A good way to remove the cobalt is by a thermal method wherein the accrued product in the first stage is heated to a temperature of from about 300°–350° F. Conveniently, a steam coil immersed in the liquid to be decobalted is employed. A pressure of from about 100–175 p. s. i. g. is maintained in the decobalting zone by the injection of a gasiform material such as hydrogen, an inert vapor, etc. It is desirable to employ a gasiform material in order that the CO partial pressure be maintained at a relatively low value in the decobalting zone. Periodically, it is necessary to take the decobalter off stream to remove accumulated metallic cobalt to prevent plugging of feed lines and adjacent areas of the decobalting vessel. Furthermore, cobalt metal deposits as a film on the heating means and requires constant removal to prevent plugging of the preheating equipment and surfaces. The removal of these films and deposited cobalt metal is a tedious and difficult process and adds a significant cost to the economics of the carbonylation reaction.

The purpose of the invention is to provide an efficient means for receiving cobalt in the catalyst decomposition zone.

Another purpose of the present invention is to provide a continuous method of decobalting the crude aldehyde product from the first stage of the process, which entirely avoids the older method of shutting down the decobalter to remove deposited cobalt by manual means.

Other and further objects and advantages of the invention will become apparent from the description hereinafter.

It has now been found that plugging may be substantially prevented in the decobalting vessel and cobalt readily removed by a continuous process wherein the aldehyde product and dissolved catalyst withdrawn from the primary carbonylation zone is admixed with steam at moderate pressures and somewhat elevated temperatures and discharged into the catalyst decomposition zone. Conditions of temperature and pressure are preferably adjusted to maintain some water in the liquid phase. The live steam serves to heat the aldehyde product to a temperature sufficient to decompose the cobalt carbonyl and other metal complexes. The mixture is then cooled, gases removed overhead, and the material is conveyed to a separator. The upper aldehyde layer is withdrawn, passed if desired, through a filter to remove any suspended or dispersed cobalt, then passed to the hydrogenation zone. In like manner, the lower aqueous layer may be passed through suitable filters and cobalt recovered. The recovered cobalt may, if desired, be reconverted into catalyst by a manner known per se.

The present invention and its application will best be understood from the more detailed description hereinafter, wherein reference will be made to the accompanying drawing, which is a schematic representation of a system suitable for carrying out a preferred embodiment of the invention.

Referring now to the diagram, an olefinic hydrocarbon having one carbon atom less than the number of carbon atoms in the desired resulting oxygenated compound, preferably alkali washed prior to reaction, and preheated in a fired coil (not shown), is fed through feed line 4 to the bottom portion of primary reactor 2. The latter comprises a reaction vessel which may, if desired, be packed with non-catalytic material, such as Raschig rings, porcelain chips, pumice, and the like. Reactor 2 may be divided into discrete packed zones, or it may comprise but a single packed zone, or even, if desired, may contain no packing.

The olefinic feed contains dissolved therein 0.1–0.5% by weight of cobalt based on the olefin. Compounds of cobalt or iron or their mixtures may be employed. Cobalt oleate or naphthenate is preferably used. Simultaneously a gas mixture comprising $H_2$ and CO in the approximate ratio of 0.5 to 2 volumes of $H_2$ per volume of CO is supplied through line 6 to primary reactor 2 and flows concurrently through reactor 2 with said olefin feed. This gaseous mixture of $H_2$ and CO is preheated with the olefin in the fired coil mentioned above to virtually reaction temperatures. A minor portion of the $H_2$ and CO gaseous mixture may, however, bypass the fired coil. Just prior to introduction of the feed into the reactor 2, the catalyst is injected into the feed stream. Reactor 2 is preferably operated at a pressure of about 2500–3500 p. s. i. g. and at a temperature of about 250°–450° F., depending upon the olefin feed and other reaction conditions. The rate of flow of synthesis gases and olefin through reactor 2 is so regulated that the desired conversion level of the olefin is obtained.

Liquid oxygenated reaction products containing catalyst in solution, and unreacted synthesis gases are withdrawn overhead from an upper portion of high pressure reactor 2 and are transferred through line 8 to cooler 10 in which any conventional means of cooling are employed, and from thence via line 12 to high pressure separator 14 where unreacted gases are withdrawn overhead through line 16, scrubbed in scrubber 18 of entrained liquid and cobalt carbonyl and used in any way desired. They may be recycled to synthesis gas feed line 6 via line 20 and booster compressor 23, or purged via line 19.

A stream of primary reaction product containing dissolved therein a relatively high concentration of cobalt carbonyl and/or hydrocarbonyl is withdrawn from separator 14 through line 22. A portion of said withdrawn stream may be recycled, if desired, to reactor 2 via line 24 to aid in the cooling and maintenance of temperature control of the primary carbonylation stage. The balance of the primary reaction product may be withdrawn through pressure release valve 26 and through line 28. The withdrawn liquid may comprise any unreacted olefin as well as aldehydes, secondary reaction products, and dissovled catalyst compounds. This liquid is passed through line 28 to decobalter 30. Also charged to the first of two decobalter towers 30 (one shown) is water or live steam admitted through pump 31 and line 32. Steam may be injected into the decobalter at the system pressure of from about 0–500 p. s. i. g., preferably in the range of from about 50–200 p. s. i. g. and superheated to a temperature in the range of from about 212–400° F. Conditions of temperature and pressure are preferably adjusted to maintain some water in the liquid phase. Decobalter 30 may be heated by heating coil 51. Within decobalter 30 cobalt carbonyl is substantially decomposed and the streams of carbonylation product, steam and water containing soluble and insoluble decomposed catalyst is passed through line 34 to soaker 38 where part of the remaining steam is allowed to condense. Gasiform material, such as CO resulting from the decomposition of the cobalt carbonyl, and remaining uncondensed steam are withdrawn overhead from 38 through line 36. In soaker 38 the material is allowed to stratify into two liquid layers, namely, an upper layer comprising mainly carbonylation product and other organic material, and a lower aqueous layer, wherein the bulk of the cobalt appears in both soluble and insoluble form. The upper layer is withdrawn from 38 through riser 40 and line 42 and passed into settler 44. Carbonylation product now substantially free of cobalt is withdrawn from settler 44 by line 46 and pump 48 and passed through filter 50 and line 52 to the hydrogenation stage as indicated above. Any aqueous layer in settler 44 is withdrawn through line 54 for recovery of catalyst contained therein.

The lower aqueous layer in soaker 38 is withdrawn through line 41. This stream contains the bulk of the decomposed catalyst and it may be recycled as a catalyst stream back to the oxo stage through line 4 or the decomposed catalyst may be recovered for reuse in its original form.

The invention admits of numerous modifications apparent to those skilled in the art. Thus, mention has not been made of various accessory equipment which normally would be used in a commercial plant. Thus, in the interest of good heat economy, various heat exchangers and economizers would be employed to utilize whatever heat is available in the most efficient manner, and in order to control the process, pumps, compressors, valves, flow meters, etc. would be included in the equipment. If desired, either or both the upper and lower layers in zone 46 may be passed to a settling zone, where suspended cobalt material may be allowed to settle out prior to filtering. Also, instead of steam, water under suitable conditions of temperature and pressure may be employed in the decobalting step. Decobalter 30 may comprise two towers, operated in series or alternately.

To illustrate further the excellent results obtained by this inexpensive and effective method for removing catalyst from the primary carbonylation reaction product, steam at 340° F. was injected at 125 pounds pressure into a closed two-liter bomb containing one liter of water and 500 cc. of primary carbonylation reaction product resulting from carbonylation of a C7 olefin. After the pressure in the bomb reached that of the steam, one liter of water was drained from the bottom of the bomb over a period of a half hour, the bomb being maintained under a pressure of 125 pounds during this interval. The bomb was then cooled and the product withdrawn. A centrifuged sample of this resulting product contained 0.004% cobalt as compared to 0.113% cobalt in the sample before steam treating.

A more complete removal of cobalt in the decobalting step may be achieved by adding water (or steam) in amounts from 2% up to 50% by volume of the oxo or first stage product and carrying out the decobalting at temperature in the range of about 250°–500° F., while maintaining a pressure of from about 50–175 lbs. per sq. inch on the decobalting system. These severe decobalting conditions just now described have been shown, in a commercial unit, to remove over 99% of the cobalt dissolved in the crude aldehyde as it is recovered from the first stage of the process. The recovered cobalt may be in the form of cobalt metal, cobalt formate or basic cobalt formate. Formic acid is probably synthesized during the first stage of the process, or it may be formed from the oleic, naphthenic or other acid radicals associated with the cobalt to the first stage of the process to produce formate or basic cobalt formate. In any event, formic acid apparently reacts with the cobalt, in the presence of the added water, to produce the cobalt formate or basic formate. The thus recovered cobalt or basic cobalt formate may be recycled to the first stage of the process in solution or suspension, formed into a paste and injected into the oxo stage by piston displacement, or converted to a more suitable catalyst.

Another important variable in good decobalting is that of residence time. In other words, in order to permit reaction between the cobalt material and the formic acid (produced by hydrolysis of esters present in the first stage, by synthesis from reactants in first stage, etc.) a time period of about 2 hours is required where the conditions are as follows:

Temperature ----- 300°–350° F.
Pressure --------- 100–200 p. s. i. g.
Per cent water in liquid phase ---- 1–25% (by volume), preferably 5–20%
Residence time ---- 2 hrs. (e. g. in a soaking drum — not shown in drawing).

There is listed in the following table the results of five tests which show that the present invention of water injection into the decobalter is superior to the older thermal method described previously. In test No. 1 the older thermal decobalting method was employed, while in test Nos. 2–5 varying amounts of water in the liquid phase existed in the decobalting zone as shown in the data appearing in the table. As these data show, maintaining 16 volume per cent water in the liquid phase permitted as satisfactory decobalting as the maintenance of the higher amounts of 43 and 76 volume per cent water in the liquid phase.

*Table*

| Test No. | 1 | 2 | 3 | 4 | 5 |
|---|---|---|---|---|---|
| Water injection, Vol. percent | 0 | 2½ | 5 | 10 | ----- |
| Water in liquid phase, Vol. percent [1] | 0 | 16 | 43 | 76 | 7 |
| Decobalter Temperature, °F.: | | | | | |
| First Tower | 330 | 340 | 340 | 340 | 200 |
| Second Tower | 350 | | | | |
| Soaker | 325 | 315 | 315 | 315 | 260 |
| Decobalter pressure, p. s. i. g. | 100–150 | 175 | 175 | 175 | 100 |
| Cobalt Analysis: Product, p. p. m.[2] soluble | 100–500 | <4 | <4 | <4 | <8 |

[1] Based on water injected.
[2] Parts per million of cobalt material remaining dissolved after decobalting treatment.

In the foregoing test, as previously indicated, test No. 1 was carried out employing the older thermal decobalting method with the towers operating in series. In test No. 2 cobalt metal, cobalt formate and basic cobalt formate separated in the soaking durm. Water drawn from the soaker contained dissolved cobalt formate plus free formic acid. In test No. 3 no basic cobalt was formed, but otherwise the same results were secured here as were secured in test No. 2. In test No. 4 the same results were obtained as obtained in test No. 3, namely, they were the same as obtained in test No. 2 except for the fact that no basic cobalt formate was formed. In test No. 5 the decobalting was achieved by direct steam injection, and it will be noted that slightly poorer results were obtained here in that the crude aldehyde product, after the decobalting, contained less than 8 parts per million of cobalt material, whereas in test Nos. 2–4, the aldehyde product contained less than 4 parts per million, following decobalting.

Another feature of the present invention involves "degassing" the crude aldehyde product prior to the water injection. This may be accomplished by reducing pressure. Degassing has the effect of reducing corrosion of the gas phase equipment caused by formic acid (or other acidic material), present in the aldehyde product.

Numerous modifications of the invention may be made by those familiar with the art.

What is claimed is:

1. In a carbonylation process wherein carbon compounds containing olefinic double bonds are contacted in an initial reaction zone with carbon monoxide and hydrogen in the presence of a cobalt carbonylation catalyst under conditions to produce reaction products comprising oxygenated organic compounds containing at least one more carbon atom than said carbon compounds and wherein cobalt carbonyl is dissolved in said reaction products, and the solution comprising said reaction products and the therein dissolved cobalt carbonyl is transferred to a catalyst removal zone, the improvement which comprises injecting a fluid selected from the class of live steam and water in said solution, maintaining a temperature of the mixture of from about 200°–500° F. in said catalyst removal zone, maintaining a liquid water phase in said zone, and maintaining a contact time of said reactants for a period sufficient to cause a hydrolytic reaction.

2. The process of claim 1 wherein the system is under a pressure in the range of about 0–500 p. s. i. g.

3. The process of claim 1 where the system is under a pressure of about 50–200 p. s. i. g.

4. In a carbonylation process wherein olefinic carbon compounds are contacted in an initial reaction zone with carbon monoxide and hydrogen in the presence of a cobalt carbonylation catalyst under conditions to produce reaction products comprising oxygenated organic compounds containing at least one more carbon atom than said olefinic compounds and wherein cobalt carbonyl is dissolved in said reaction products, and the solution comprising said reaction products and the therein dissolved carbonyl transferred to a catalyst removal zone, the improvement which comprises injecting live steam at a temperature from about 212° to about 400° F. into said catalyst removal zone in contact with said solution, heating said solution by the sensible heat of said steam, and the heat released by condensation of said steam, maintaining a residence time of said reactants for a period sufficient to cause a hydrolytic reaction, maintaining a liquid water phase in said zone whereby said cobalt carbonyl is decomposed into products comprising metallic cobalt, cobalt formate and basic cobalt formate maintaining said solids substantially suspended in said mixture of steam, water and carbonylation product, transferring a mixture comprising said steam, water, carbonylation product, and suspended solids to a cooling zone, condensing said steam, passing a mixture of carbonylation product, condensed steam and suspended decomposed catalyst to a quiescent zone, and separating an upper layer comprising said carbonylation product from said zone.

5. The process of claim 4 wherein said upper layer is sent to a settling zone prior to passage through a filtration zone.

6. The process of claim 5 wherein said upper layer is sent to a filtration zone and an aldehyde product substantially free of catalytic material is recovered.

7. The process of claim 6 wherein said filtered product is sent to a hydrogenation zone.

8. The process of claim 4 wherein a lower aqueous layer containing suspended decomposed catalytic material is withdrawn from said quiescent zone, passed to a filtration zone, and recovered catalytic material is re-employed to furnish at least a portion of the catalytic requirements of the system.

9. In a carbonylation process wherein carbon compounds containing olefinic double bonds are contacted in an initial reaction zone with carbon monoxide and hydrogen in the presence of a cobalt carbonylation catalyst under conditions to produce product comprising oxygenated organic compounds containing at least one more carbon atom than said first named carbon compounds and wherein cobalt carbonylation catalyst is dissolved in said reaction products, and the solution comprising said reaction products and the therein dissolved cobalt carbonyl is transferred to a catalyst removal zone, the improvement which comprises injecting water from an external source into said last named zone, maintaining a temperature of from about 200–500° F. in said zone and maintaining a pressure in said zone such that at least a portion of the water in said zone is in the liquid phase, maintaining a residence time of said reactants for a period sufficient to hydrolize at least a portion of the hydrolyzable components of said reaction products, withdrawing an aldehyde product substantially free of dissolved cobalt from said zone, and withdrawing cobalt-containing water from said zone.

10. The process of claim 9 wherein said pressure is about 50–200 pounds.

11. The process of claim 9 wherein the amount of water added to said catalyst removal zone is about 2–50% by volume of said oxygenated product passed to said zone.

12. The process of claim 9 wherein 1–25% of said water injected into said last named zone is maintained in the liquid state in said zone.

13. The process of claim 9 wherein the residence time of said reactants is maintained long enough to hydrolize at least a portion of the esters comprising said oxygenated product withdrawn from said initial zone.

14. The process of claim 9 wherein at least a portion of said cobalt-containing water recovered from said catalyst removal zone is passed to said initial reaction zone to provide a portion of the catalytic requirements of said zone.

15. The process of claim 9 wherein said oxygenated product, prior to passage to said catalyst removal zone, is degassed.

References Cited in the file of this patent

UNITED STATES PATENTS

| Number | Name | Date |
|---|---|---|
| 2,504,682 | Harlan | Apr. 18, 1950 |
| 2,514,961 | Max | July 11, 1950 |
| 2,596,920 | Smith et al. | May 13, 1952 |
| 2,636,903 | Mertzweiller | Apr. 28, 1953 |